(12) United States Patent
Tabata

(10) Patent No.: US 11,216,135 B2
(45) Date of Patent: Jan. 4, 2022

(54) TOUCH-SENSITIVE ELECTRONIC DEVICE AND SENSOR CONTROL METHOD

(71) Applicant: ALPS ALPINE CO., LTD., Tokyo (JP)

(72) Inventor: Masashi Tabata, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 46 days.

(21) Appl. No.: 16/654,128

(22) Filed: Oct. 16, 2019

(65) Prior Publication Data

US 2020/0050341 A1 Feb. 13, 2020

Related U.S. Application Data

(63) Continuation of application No. PCT/JP2018/006475, filed on Feb. 22, 2018.

(30) Foreign Application Priority Data

Apr. 20, 2017 (JP) .............................. JP2017-083946

(51) Int. Cl.
*G06F 3/041* (2006.01)
*G06F 3/044* (2006.01)

(52) U.S. Cl.
CPC ........ *G06F 3/0446* (2019.05); *G06F 3/04166* (2019.05); *G06F 2203/04108* (2013.01)

(58) Field of Classification Search
None
See application file for complete search history.

(56) References Cited

U.S. PATENT DOCUMENTS

| | | |
|---|---|---|
| 9,323,379 B2 | 4/2016 | Aubauer et al. |
| 9,383,867 B2 | 7/2016 | Hirakawa et al. |
| 2011/0055305 A1 | 3/2011 | Matsushima |

(Continued)

FOREIGN PATENT DOCUMENTS

| | | |
|---|---|---|
| JP | 2008-117371 | 5/2008 |
| JP | 2010-257046 | 11/2010 |

(Continued)

OTHER PUBLICATIONS

International Search Report dated Apr. 3, 2018 in PCT/JP2018/006475 filed on Feb. 22, 2018.

*Primary Examiner* — Krishna P Neupane
(74) *Attorney, Agent, or Firm* — IPUSA, PLLC

(57) ABSTRACT

A touch-sensitive electronic device has a sensor part to detect a capacitance that varies according to a touch or a proximity of an operation body on or to an operation surface, a memory part to store a reference value used as a basis of calculation of an amount of change in the capacitance and a threshold value used for detection of the touch or the proximity, a determination part configured to compare the amount of change in the capacitance with the threshold value and to determine a state of the touch or the proximity, and a controller configured to suspend touch sensing during a period when the proximity of the operation body is not detected by the determination part, and to suspend proximity sensing operation during a period when the touch of the operation body is detected by the determination part.

13 Claims, 7 Drawing Sheets

(56) References Cited

U.S. PATENT DOCUMENTS

| | | | | |
|---|---|---|---|---|
| 2011/0175831 A1* | 7/2011 | Miyazawa | ............. | G06F 3/041 |
| | | | | 345/173 |
| 2011/0279364 A1 | 11/2011 | Koshiyama et al. | | |
| 2013/0076688 A1* | 3/2013 | Tokutake | ................ | G06F 3/044 |
| | | | | 345/174 |
| 2013/0278560 A1 | 10/2013 | Yamaguchi | | |
| 2015/0116280 A1* | 4/2015 | Moon | ................... | G06F 3/0416 |
| | | | | 345/178 |
| 2018/0329532 A1* | 11/2018 | Noguchi | ................ | G06F 3/041 |

FOREIGN PATENT DOCUMENTS

| | | |
|---|---|---|
| JP | 2011-047774 | 3/2011 |
| JP | 5632854 | 11/2014 |
| JP | 2015-505393 | 2/2015 |
| WO | 2012/090405 | 7/2012 |

* cited by examiner

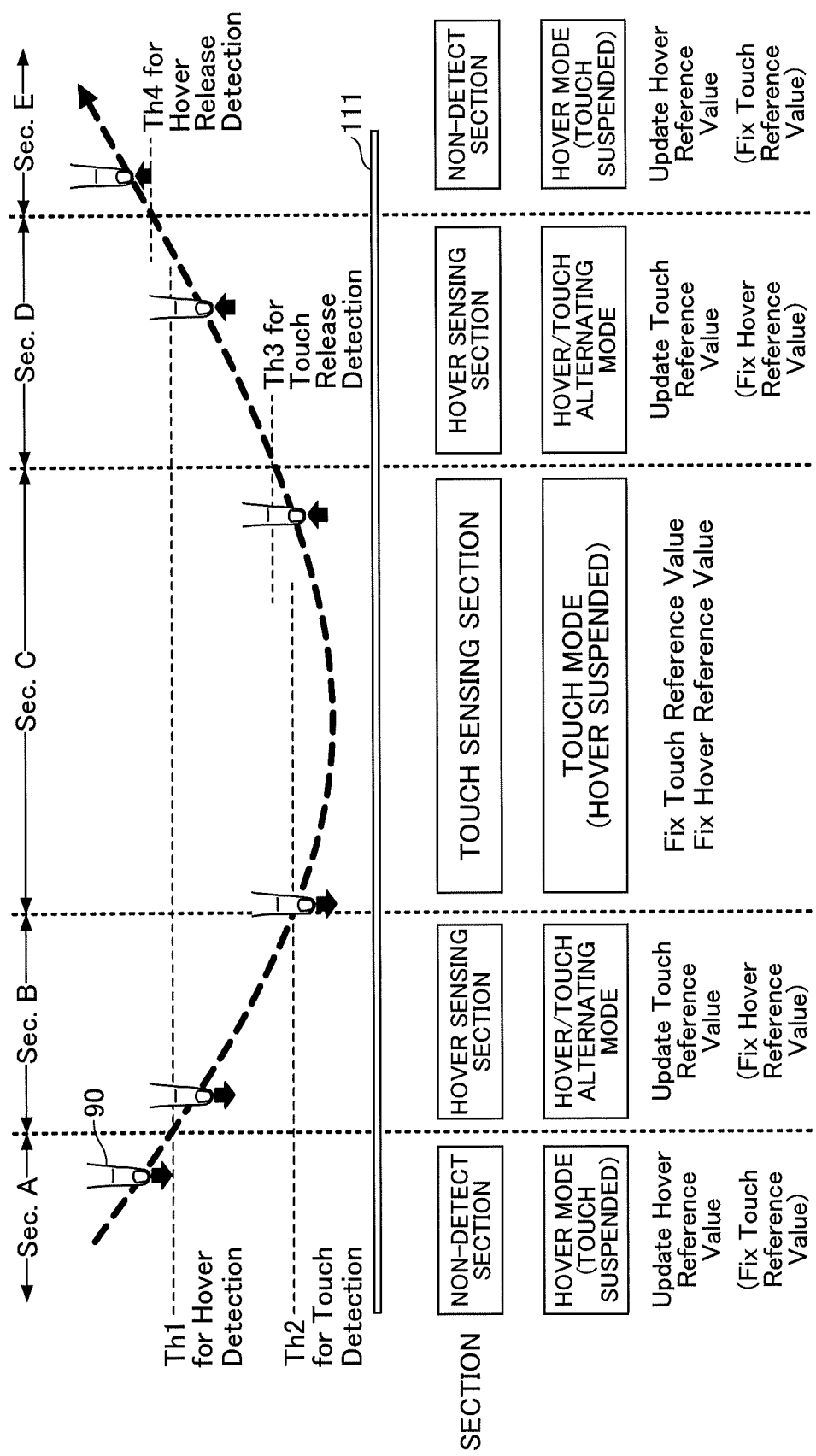

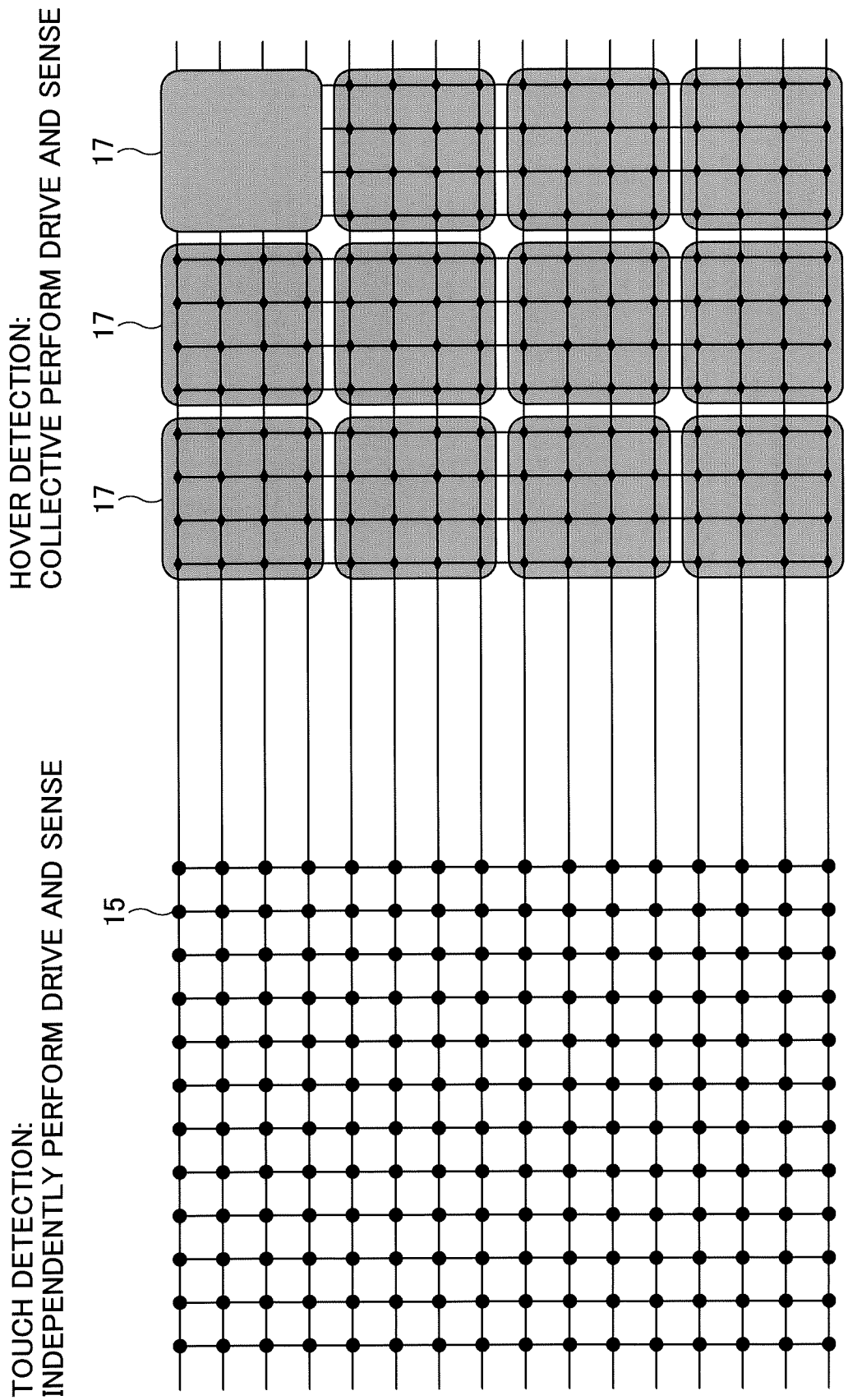

TOUCH-SENSITIVE ELECTRONIC DEVICE AND SENSOR CONTROL METHOD

CROSS REFERENCE TO RELATED APPLICATIONS

This application is a continuation application filed under 35 U.S.C. 111(a) and claims benefit under 35 U.S.C. 120 and 365(c) of PCT International Application No. PCT/JP2018/006475 filed on Feb. 22, 2018 and designating the United States, which International Application claims the priority of Japanese Patent Application No. 2017-083946 filed Apr. 20, 2017, both applications being incorporated herein by reference in its entirety.

FIELD OF THE INVENTION

The present invention relates to a touch-sensitive electronic device and a control technology thereof.

DESCRIPTION OF RELATED ART

In recent years, touch-sensitive user interfaces such as mobile terminals, tablet terminals, and notebook personal computers (PCs) have been widespread. There are various types of touch sensors, and among these, a capacitive sensor is configured to detect an input operation based upon a change in capacitance caused by a user's fingertip or the like that is in physical contact with or approaching an operation surface. One known structure is that a non-contact sensing means is provided in addition to a touch-sensitive screen to determine the touch position and the non-contact position simultaneously and/or alternately. See, for example, Patent Document 1, namely, JP-T-2015-505393. A method of detecting proximity of a user to the display panel is also proposed, by providing an electrode pair for a proximity sensor in addition to an electrode pair for a touch sensor. See, for example, Patent Document 2, namely, Japanese Patent No. 5632854 which corresponds to WO 2011/055534.

In the known configurations described above, means for detecting a proximity state or a non-contact position is provided separately from the touch detection sensor, which makes the sensor structure complicated and expensive. In general, for detecting a proximity state and a touch state by using the same sensor, a conceivable configuration is to perform proximity sensing and touch sensing alternately by time-dividing a sensing time. In this case, proximity state sensing operation and touch state sensing operation are carried out alternately every cycle of drive and sense. With such a time division system, the frequency or the number of times of proximity sensing is limited due to the tendency of degradation in signal-to-noise (S/N) ratio, and it is difficult to maintain the detection accuracy high.

SUMMARY OF THE INVENTION

The present disclosure provide a touch-sensitive electronic device and a control method thereof that enable to detect accurately both a proximity state and a touch state with the same sensor means.

To achieve this, the operation mode is switched between proximity sensing and touch sensing according to the transition between operational sections, thereby increasing the number of proximity sensing and the number of touch sensing per unit time.

In one aspect of the invention, a touch-sensitive electronic device includes a sensor part configured to detect a capacitance that varies according to a touch or a proximity of an operation body on or to an operation surface, a memory part that stores a reference value used as a basis of calculation of an amount of change in the capacitance and a threshold value used for detection of the touch or the proximity, a determination part configured to compare the amount of change in the capacitance calculated based on the reference value with the threshold value and determine a state of the touch or the proximity with respect to the operation surface, and a controller configured to suspend a touch sensing operation in the sensor part during a period when the proximity of the operation body to the operation surface is not detected by the determination part, and to suspend a proximity sensing operation in the sensor part during a period when the touch of the operation body on the operation surface is detected by the determination part.

In another aspect of the invention, a touch-sensitive electronic device includes a sensor part configured to detect a capacitance that varies according to a touch or a proximity of an operation body on or to an operation surface, a memory part that stores a reference value used as a basis of calculation of an amount of change in the capacitance and a threshold value used for detection of the touch or the proximity, a determination part configured to compare the amount of change in the capacitance calculated based on the reference value with the threshold value and determine a state of the touch or the proximity with respect to the operation surface, and a controller configured to allow a touch sensing operation and a proximity sensing operation to be performed in the sensor part during a period when the proximity of the operation body to the operation surface is detected by the determination part, and to suspend the proximity sensing operation in the sensor part during a period when the touch of the operation body on the operation surface is detected by the determination part.

With the configurations described above, both the proximity state and the touch state can be detected accurately using the same sensor means.

BRIEF DESCRIPTION OF DRAWINGS

FIG. 1 is a diagram for explaining basic operations of an electrostatic touch sensor used in an embodiment;

FIG. 3 is a diagram for explaining schemes of touch detection and hover detection;

DESCRIPTION OF THE PREFERRED EMBODIMENTS

FIG. 1 illustrates basic operations of a touch-sensitive electronic device according to an embodiment. A user conducts an input action on an operation surface 111 using an operation body such as a finger 90. The operation surface 111 may be the top face of a touch panel used in mobile devices such as smartphones and tablets, in-vehicle navigation devices, ATMs, home appliances, etc. The touch panel is a touch-sensitive user interface, and there are various types of touch sensors including a resistive film type, an infrared type, and an ultrasonic type. In the embodiment, a capacitive type touch sensor is used. A capacitive sensor detects a contact position or a proximity position based upon a change in capacitance due to physical contact or close proximity of the operation body.

Figure 2A:
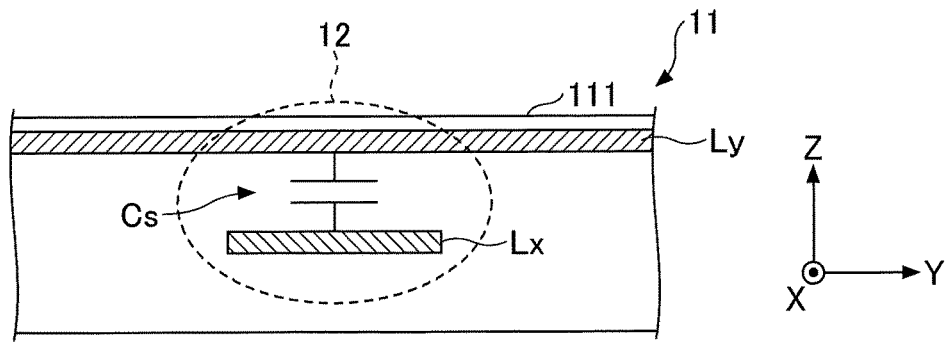
FIG. 2A is a diagram for explaining a change in capacitance in a capacitive sensor.
Figure 2B:
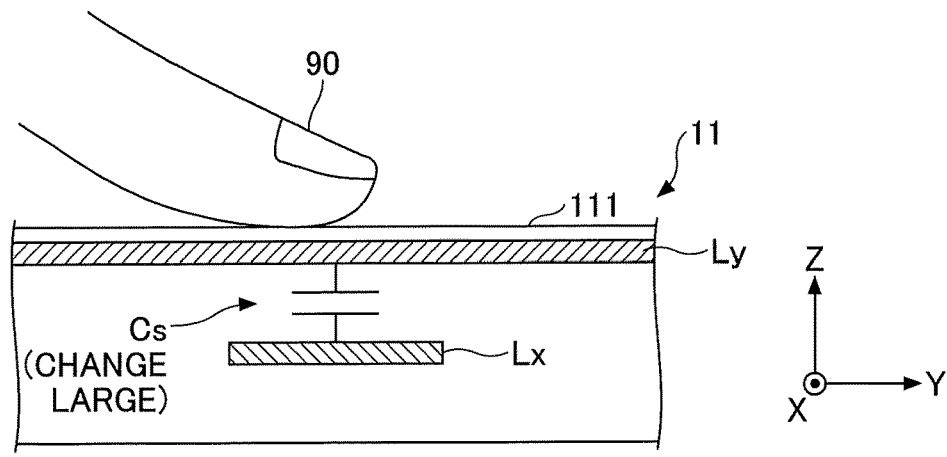
FIG. 2B is a diagram for explaining a change in capacitance in a capacitive sensor.
Figure 2C:
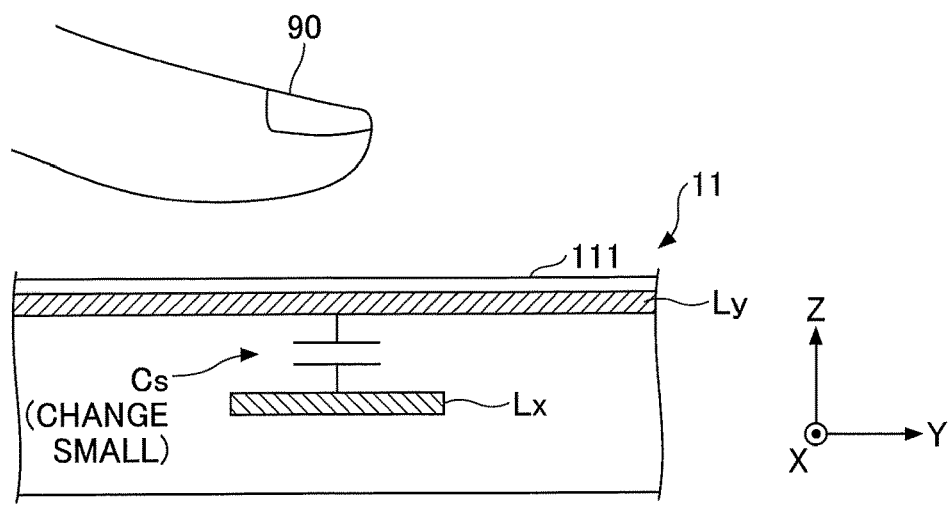
FIG. 2C is a diagram for explaining a change in capacitance in a capacitive sensor.

FIG. 2A to FIG. 2C are diagrams for explaining a change in capacitance in a capacitive sensor. At an intersection of the electrode Lx extending in the X direction and the electrode Ly extending in the Y direction, a capacitance Cs is generated between the electrode Lx and the electrode Ly, whereby a capacitive sensor element 12 is produced. With a plurality of electrodes Lx and a plurality of electrodes Ly extending orthogonal to each other, a plurality of sensor elements 12 are formed in a matrix. One of the two orthogonal electrodes, for example, electrode Lx may be used as a drive electrode, and the other electrode, for example, electrode Ly may be used as a sense electrode. By applying a periodically changing voltage to the electrode Lx, the potential of the sensor element 12 varies and charging and discharging occur. By detecting the quantity of electrical charge through the electrode Ly, the electrostatic capacitance at the sensor element 12 is detected.

FIG. 2A illustrates a state in which no operation body existing near the operation panel 11 and neither a touch nor a proximity is detected. A section in which there is no operation body existing near around and in which neither touch nor proximity is detected is referred to as a "non-detect section" in the embodiment. The capacitance Cs in the non-detect section becomes a reference for calculating a change in capacitance; however, the capacitance Cs itself varies according to the environmental change. Therefore, the capacitance Cs is detected at each sensor element 12 every cycle of drive and sense of the capacitive sensor, and the reference value is updated based upon the detected value. The reference value may also be called a "baseline" value.

In FIG. 2B, a finger 90 is in contact with the operation surface 111 of the operation panel 11. This state is referred to as "touch". Due to the capacitive coupling between the finger 90 and the electrode Ly, the capacitance Cs of the sensor element 12 changes (more specifically, increases) greatly. In contrast, in FIG. 2C, the finger 90 is located close to the operation surface 111 of the operation panel 11 but is not in physical contact therewith. The state in which the operation body such as the finger 90 is floating in the vicinity of the operation panel 11 is referred to as "hover". In the present specification and claims, "proximity" represents a "hover" state. In the hover state, the capacitance Cs at the sensor element 12 changes due to the change in the capacitive coupling state between the finger 90 and the electrode Ly. Because an air layer lies between the finger 90 and the operation surface 111 in the hover state, the change in capacitance is small compared to the amount of change in the touch state. Accordingly, by setting different levels of threshold, it is possible to detect "hover" and "touch" by using the same sensor matrix.

Returning to FIG. 1, upon startup or power-on of the touch-sensitive electronic device, the capacitive sensor is driven to perform hover detection and touch detection alternately, and the reference (or the baseline) values are updated at each sensor element. The drive and sense cycle is repeated a predetermined number of times for hover and touch, respectively, and the reference values of the capacitance are updated to the latest values. Then, the touch detection operation is turned off.

<Section A>

Section A is a "non-detect section" in which neither hover nor touch is detected. As a feature of the embodiment, in the section A, hover detection is performed exclusively until the amount of change in capacitance reaches a hover detection threshold Th1, while the touch detection is suspended. In the section A, the hover reference value is updated every time the drive/sense operation is carried out for the hover detection, and the amount of change in capacitance is calculated for each sensor element by using the updated reference value. The hover reference value corresponds to the "first reference value" described in "Claims", which represents a capacitance acquired when no operation body exists near around, neither in the hover sensing section nor the touch sensing section. In the non-detect section, touch sensing is suspended, and the touch reference value is fixed to a value set when the sensor is started up. As only hover sensing is performed in a cycle, the number of times of hover detection per unit time is increased, and the hover detection accuracy can be improved. In particular, as hover detection data can be averaged within a cycle, the S/N ratio of the hover sensing is increased and the detectable range can be extended. As the entirety of the cycle is used only for hover sensing, the user's hover action can be detected more promptly.

<Section B>

When the amount of change in capacitance reaches the hover detection threshold Th1, detection of a "hover" is output and the touch sensing mode is turned on. The section B that begins at the detection of the hover and continues until a touch is detected is referred to as a "hover sensing section". Upon turning on the touch sensing mode, updating of the touch reference value is started. The touch reference value corresponds to the "second reference value" described in "Claims", which represents a capacitance acquired when the operation body is not in physical contact with the operation surface 111 but is within the hover detectable zone. When the touch reference value reaches a touch detection threshold Th2, detection of the "touch" is output. Upon the detection of the hover, updating of the hover reference value is stopped, while the hover sensing operation is continued. By fixing the hover reference value, an undesirable situation where in spite of the unchanged position of the operation body such as the finger 90, the hover reference value is changed and a wrong detection result is output can be prevented.

In the section B, both touch sensing and hover sensing are performed. There are two possible scenarios in the section B, one is that the operation body moves quickly onto the operation surface 111, and the other is that the operation body is drifting in the vicinity of the operation surface 111 without coming into physical contact with it. The latter scenario may be a case where the user is looking for a desired input item such as an icon, or wondering which input item to select. Therefore, both the hover sensing and the touch sensing are activated, and the touch reference value is updated for accurate detection of a touch event. At a point of time when touch sensing becomes necessary, the touch reference value having been fixed to the initial setup value is updated to a new value for the current drive/sense cycle. No special processing is required for switching the operation.

<Section C>

When the amount of change in capacitance reaches the touch detection threshold Th2 which is greater than the hover detection threshold Th1, detection of the "touch" is output and the hover sensing is suspended. The section C beginning at the touch detection and continuing until a touch release is detected is called a "touch sensing section" in which the touch sensing is exclusively performed. Upon detection of the touch, updating of the touch reference value is stopped. The hover reference value is kept fixed to the value just after the detection of the hover. This prevents an erroneous detection result from being output due to fluctuation of the reference value during the touch sensing. In the section C, hover sensing is not performed and the entirety of the cycle can be used only for the touch sensing. Consequently, touch sensing can be performed at fine intervals.

<Section D>

After the detection of the touch, and when the amount of change in capacitance has decreased less than a touch release detection threshold Th3, then detection of the "touch release" is output. Simultaneously, hover sensing operation is turned on, and updating of the touch reference value is resumed. In this specification, the "touch release" represents an action that the operation body such as the finger 90 has once come into a physical contact with the operation surface 111 and then left the contact surface. The term "Touch release" is synonymous with "releasing of touch" in "Claims". The section D beginning at the detection of a touch release and ending at a detection of hover release is called a "hover sensing section" in which the hover state is detected. In order for preventing erroneous detection of hover due to fluctuation of the hover reference value, the hover reference value is fixed.

The touch release detection threshold Th3 is smaller than the touch detection threshold Th2 and greater than the hover detection threshold Th1. There are two possible scenarios in the section D, one is that the operation body such as the finger 90 is leaving away from the operation surface 111, and the other is that the operation body returns back to the operation surface 111. Accordingly, both touch sensing and hover sensing are performed in one drive/sense cycle. The touch reference value is updated for the touch detection in the current cycle, and no additional processing is required for switching the sensing mode.

<Section E>

When the amount of change in capacitance becomes smaller than a hover release detection threshold Th4, detection of the "hover release" is output. Simultaneously, touch sensing is turned off, and updating of the hover reference value is resumed. Since touch sensing is deactivated, updating of the touch reference value is also suspended. In this specification, a "hover release" indicates an action that the operation body having existed in the hover detectable zone leaves to outside the hover detectable zone. The term "hover release" is synonymous with "releasing of proximity" in "Claims". After the detection of the hover release, the operation body such as the finger 90 does not exist near around the operation surface 111, and the section E is called a "non-detect section".

The hover release detection threshold Th4 is smaller than the touch release detection threshold Th3 and the hover detection threshold Th1. The "non-detect section" continues until the amount of change in capacitance becomes greater than the hover detection threshold Th1. In the section E, hover sensing is performed exclusively. Since only hover sensing is performed in one cycle, the number of hover sensing operations per unit time is increased, and hover detection accuracy can be improved. In particular, by averaging the detection data, the S/N ratio of hover detection can be increased and the detectable range can be extended. As the entirety of a cycle is used only for hover detection, hover detection timing can be advanced.

FIG. 3 is a diagram for explaining a touch and hover detection scheme, which is a premise of the operations of FIG. 1. The left-hand side of FIG. 3 illustrates data collection during touch sensing, and the right-hand side of FIG. 3 illustrates data collection during hover sensing. In the operation panel 11 using a capacitive sensor, detection points 15 are arranged in a matrix. The detection points 15 in the matrix correspond to intersections of the plurality of electrodes Lx extending in the X direction and the plurality of electrodes Ly extending in the Y direction in FIG. 2A to FIG. 2C, and the capacitive sensor element 12 is formed at each of the detection points 15. In the touch sensing mode of FIG. 3, data is collected independently at each of the detection points 15. In this example, the data, that is, capacitances are collected from 12×16 detection points. The reference value used for calculation of the amount of change in capacitance at each detection point is a value set for each detection point in the non-detect state.

In the hover sensing mode of FIG. 3, multiple detection points 15 are put together to form an area 17 with a predetermined size, and driving and sensing are performed at each area 17. With this configuration example, it is enough to collect data items only from 4×3 areas. The number of times of drive/sense in the hover sensing mode is one sixteenth (1/16) of that in the touch sensing mode. In the hover state, as the user's fingertip or the operation body is floating from the surface of the operation panel within a certain range, the area covered by the fingertip becomes wide, and this collective sensing is efficient.

The reference value for the basis of calculation of the change in capacitance in hover sensing is set for each area 17. The number of areas 17 is obviously less than the number of detection points 15, and the speed of drive and sense for the entire operation surface, in other words, the detection rate per unit time is greatly improved. An average of the detected values at detection points (or the sensor elements) included in each area 17 may be used as a detected value of the area 17. Owing to the increased hover detection rate, the smoothing process can be available, the S/N ratio can be improved and the detectable range can be extended. Besides, by sensing the hover state for each area 17, the target point the user aims at on the operation panel can be narrowed down.

When hover sensing is performed in FIG. 1, drive and sense cycles are carried out according to the hover sensing scheme illustrate in the right-hand side of FIG. 3. When touch sensing is performed in FIG. 1, drive and sense cycles are carried out according to the touch sensing scheme illustrated in the left-hand side of FIG. 3. Particularly, in section A and section E, hover sensing is performed exclusively, and the entirety of a cycle is occupied by the hover sensing, thereby increasing the detection rate. In section C, the touch sensing operations are performed exclusively, and the entire time period of one cycle can be occupied by the touch sensing. The time taken for completing the touch sensing for the entire area of the operation surface can be shortened, and touch positions can be detected at fine timings. In section B and section D, hover sensing and touch sensing are performed alternately (for example, in a time-division manner). The hover sensing cycle is significantly shorter than the touch sensing cycle, and accordingly, the number of times of hover detections can be increased.

Figure 4:
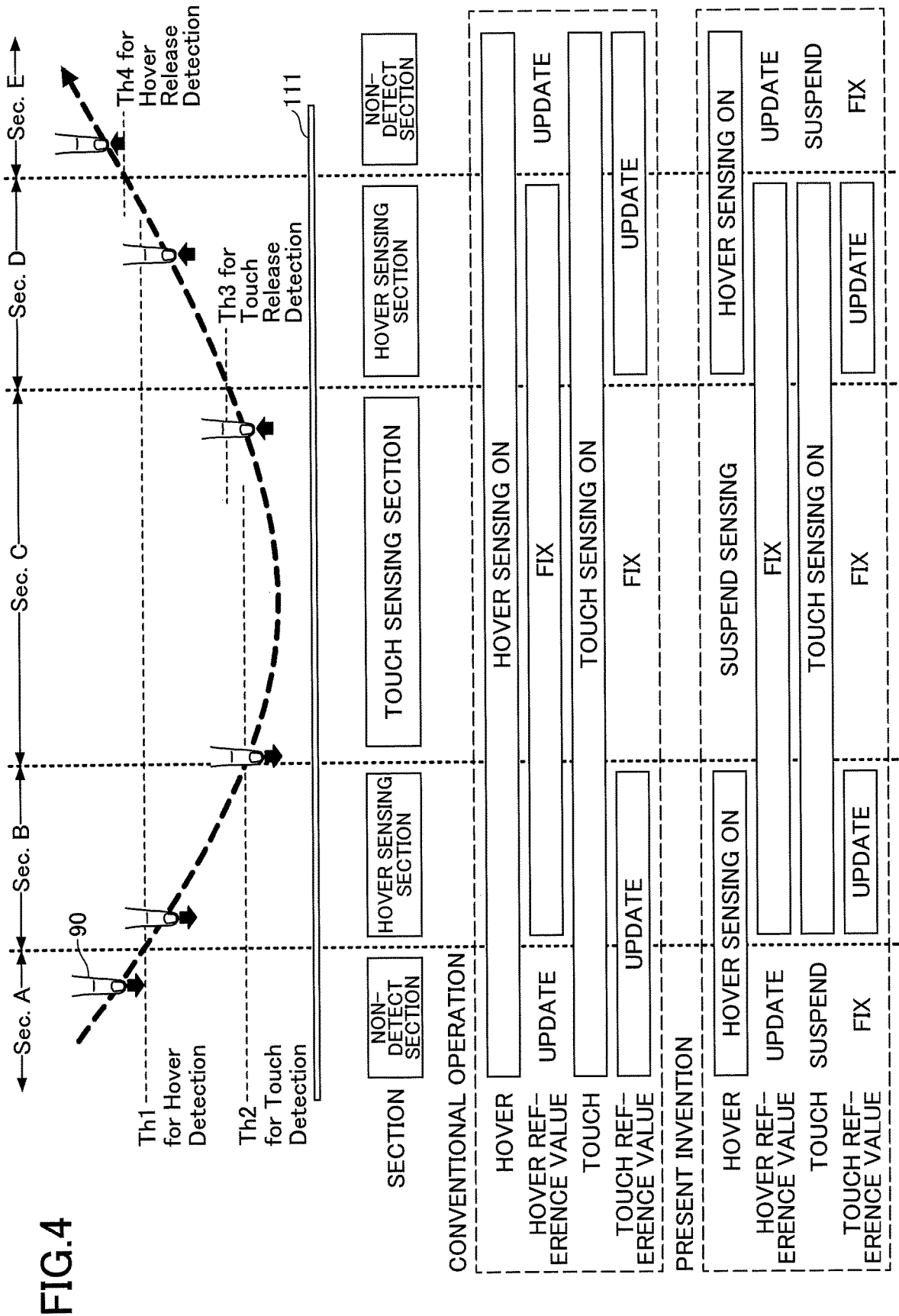
FIG. 4 is a diagram illustrating the operations of the sensor according to the embodiment in comparison with a generally conceivable operation of time-dividing system.

FIG. 4 illustrates the operations of a capacitive sensor of the embodiment, compared with a conventional scheme of switching between modes in a time-division manner. The sensing sections divided based upon the user's operation are the same as those illustrated in FIG. 1, namely, section A to section E each defined as one of "non-detect section", "hover sensing section", and "touch sensing section". With the conventional time-division scheme, while the sensor is working, hover sensing and touch sensing are performed alternately every drive/sense cycle. Therefore, over the sections A to E, both the hover sensing mode and the touch sensing mode are in the ON state. During the non-detect sections A and E, the hover reference value is updated, while in the sections B to D, the hover reference value is fixed. The touch reference value is updated in the non-detect sections A and E and in the hover sensing sections B and D, while it is fixed only in the touch sensing section C.

In contrast, according to the operation of the present invention, hover sensing is performed exclusively in the non-detect sections A and E, during which period touch sensing is suspended. Turning to the touch sensing section C, touch sensing is performed exclusively while hover sensing is suspended. Only in the hover sensing sections B and D, both hover sensing and touch sensing are performed in one cycle. The time-dividing ratio between the touch sensing and the hover sensing in one cycle can be designed appropriately. In case that a time-dividing ratio is designed to be one to one (1:1), as the number of hover sensing areas provided over the entirety of the operation surface is not so many as the detection points (see FIG. 3), hover sensing can be performed at fine timing by increasing the number of times of the hover sensing. By averaging or smoothing the collected data items, the S/N ratio of the hover sensing can be improved, and a hover state that causes less change in capacitance than a touch state can be detected more accurately.

In the non-detect sections, as only the hover reference value is updated while the touch reference value is fixed, it is possible to reduce the total amount of calculation, and to increase the calculation speed for updating the hover reference value. Throughout the entire sections, only necessary operation(s) is/are performed in a required section, and consequently, power consumption can be reduced. When the S/N ratio of hover sensing is sufficiently high, the power consumption can be further reduced by reducing the frequency of hover detection.

Figure 5:
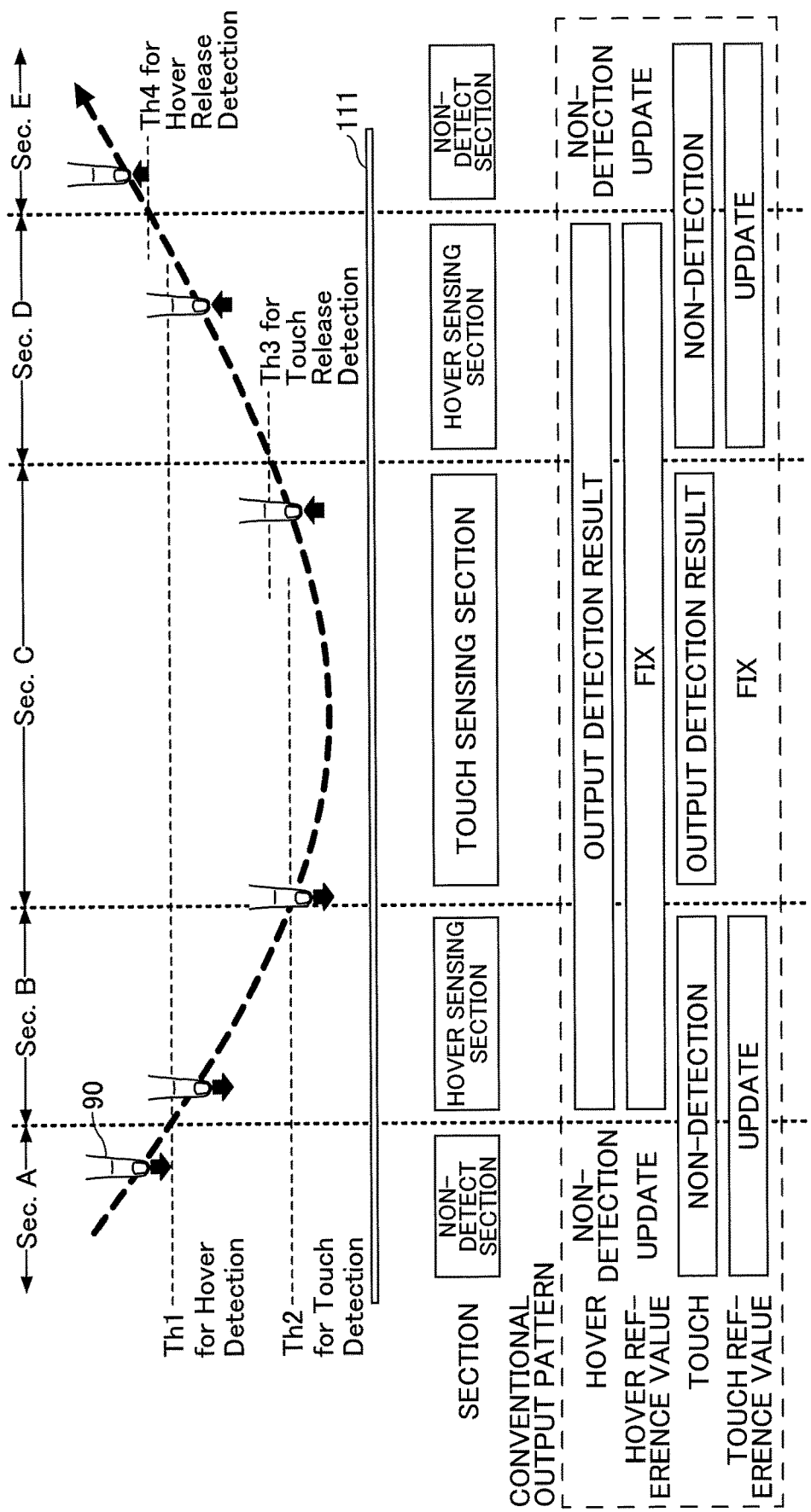
FIG. 5 is a diagram illustrating an output state in an ordinary time-dividing operation.

FIG. 5 illustrates an output pattern of the conventional time-dividing scheme of FIG. 4. In the non-detect sections A and E, neither a hover nor a touch is detected and accordingly, no detection result is output. Throughout the hover sensing section B, the touch sensing section C and the hover sensing section D, information indicative of a hover sensing result is continuously output. This is because the hover detection value always exceeds the threshold Th1 in the touch sensing section. In the section C, touch detection result is output, which means that the output of the touch detection result and the output of the hover detection result are overlapped in this section. The information required for the input detection processing in the section C is only the touch detection result, and the hover detection information is wasted.

In contrast, with the scheme of the embodiment, hover sensing operations are suspended in the touch sensing section C, such that unnecessary information about the hover state is not output. This arrangement can reduce the processing workload and power consumption.

Figure 6:
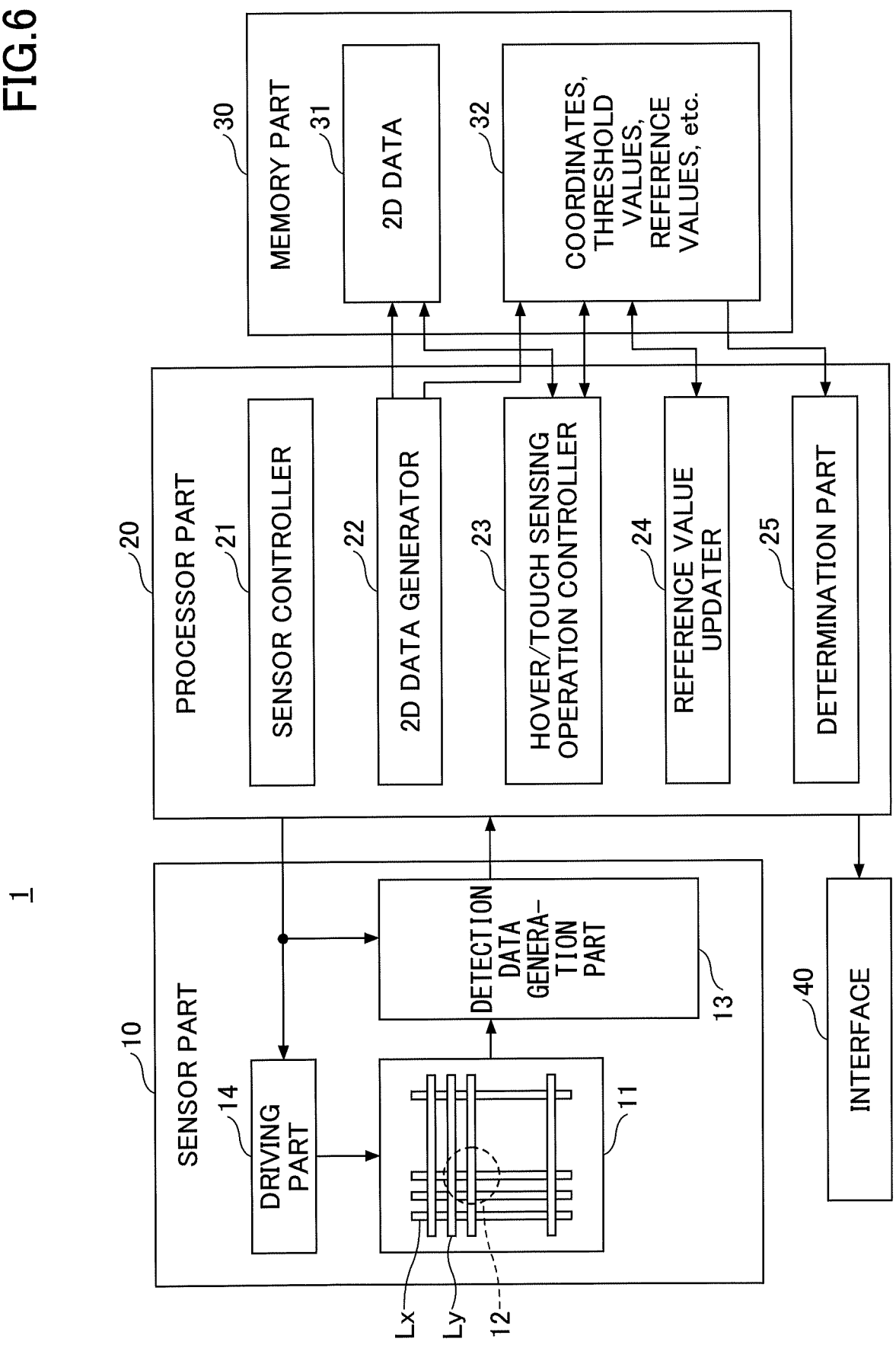
FIG. 6 is a diagram illustrating a configuration example of the touch-sensitive electronic device according to the embodiment.

FIG. 6 illustrates a configuration example of the touch-sensitive electronic device 1 of the embodiment. The touch-sensitive electronic device 1 has a sensor part 10, a processor part 20, a memory part 30, and an interface 40. The touch-sensitive electronic device 1 is applicable to any equipment that has a touch panel as a user input interface.

The interface 40 is a circuit that connects between the touch-sensitive electronic device 1 and another control device (such as a control IC of an equipment in which the touch-sensitive electronic device 1 is assembled) and is configured to allow data communication between them. A portion or all of the information saved in the memory part 30 may be output via the interface 40 to the other control device under the control of the processor part 20.

The sensor part 10 includes an operation panel 11, a detection data generation part 13, and a driving part 14. The operation panel 11 is used as a user interface for input manipulation. The operation panel 11 has a plurality of electrodes Lx extending in a first direction (for example, the X direction) and a plurality of electrodes Ly extending in a second direction (for example, the Y direction) orthogonal to the first direction. The electrodes Lx and the electrodes Ly cross each other in a mutually insulated state. Capacitive sensor elements 12 are formed at or near the intersections. The shape of the electrodes Lx and Ly is not limited to a stripe shape, and any suitable shape such as a diamond shape can be employed as long as intersections are produced.

The driving part 14 applies a drive voltage to each of the sensor elements 12. The driving part 14 can be implemented as a circuitry structure. For example, the driving part 14 sequentially selects one of the plurality of electrodes Lx under the control of the processor part 20 and applies a periodically changing voltage to the selected electrode Lx. The electrode Ly supplies electric charges having been stored at the respective intersection on the associated rows to the detection data generation part 13. The detection data generation part 13 generates a detection data for each intersection, corresponding to the amount of electric charge. The detection data is, for example, in the form of digital data generated by digitally sampling a voltage data representing the capacitance at each intersection. The detection data generation part 13 may be implemented by either a circuitry structure or a microprocessor. The detection data is supplied to the processor part 20.

The processor part 20 includes a sensor controller 21, a two-dimensional data generator 22, a hover/touch sensing operation controller 23, a reference value updater 24, and a determination part 25.

The sensor controller 21 controls the sensor part 10 such that a drive and sense operation is periodically performed for hover sensing and touch sensing at the respective detection points (i.e., the intersections at which capacitive sensor elements 12 are formed) of the operation panel 11. This control process includes control on the timing and the level of a voltage applied to the electrode Lx by the driving part 14, and control on the readout timing for the detection data from the electrode Ly performed by the detection data generation part 13.

The two-dimensional data generator 22 generates two-dimensional data 31 in a matrix format representing the amount of change in capacitance at each of the detection points on the operation panel 11 based upon the detection data output from the sensor part 10, and saves the generated data in the memory part 30. The amount of change in capacitance is calculated based upon the reference value saved in the memory part 30. The reference value is updated from the previously saved value by driving and sensing of the sensor part 10 every time the touch-sensitive electronic device 1 is boosted, and is written in the memory part 30 as a part of coordinate/threshold/reference value data 32. The threshold values in the coordinate/threshold/reference value data 32 include threshold Th1 for hover detection, threshold Th2 for touch detection, threshold Th3 for touch release detection, and threshold Th4 for hover release detection.

The reference value updater 24 updates a hover reference value in a non-detect section in which neither a hover nor a touch is detected, and updates a touch reference value in a hover sensing section. The hover sensing section refers to a section beginning at a detection of hover and ending at a detection of touch, and a section beginning at a detection of touch release and ending at a detection of hover release. The updated reference value is saved in the memory part 30 as a part of the coordinates/threshold/reference value data 32.

The determination part 25 compares the amount of change in capacitance of the current cycle at each of the detection points generated by the two-dimensional data generator 22 with the thresholds saved in the memory part 30 to determine presence or absence of hover detection, touch detection, touch release detection, and hover release detection.

Based on the determination result of the determination part 25, the hover/touch sensing operation controller 23 causes the sensor part 10 to perform hover sensing exclusively, while suspending touch sensing, in the non-detect section. In the hover sensing, a change in capacitance is detected collectively at each area 17 that includes a plurality of detection points as illustrated in the right-hand side of FIG. 3. This sensing operation may be referred to as a "first sensing mode", in which the detection cycle can be shortened. When a hover is detected according to the determination result of the determination part 25, the hover/touch sensing operation controller 23 turns on the touch sensing and allows both the touch sensing operation and the hover sensing operation to be performed. When a touch is detected according to the determination result of the determination part 25, the hover sensing operation is suspended such that the touch sensing operation is performed exclusively. In the touch sensing, a change in capacitance is detected at each of the detection points on the operation panel 11, as illustrated in the left-hand side of FIG. 3. This type of sensing may be referred to as a "second sensing mode", in which a whole cycle is used only for touch sensing. As a result, the touch detection cycle can be shortened.

Upon detection of a touch release based on the determination result of the determination part 25, the hover/touch sensing operation controller 23 turns on the hover sensing and allows both the touch sensing and the hover sensing to be performed. Upon detection of a hover release based on the determination result of the determination part 25, then the touch sensing operation is suspended such that the hover sensing is performed exclusively. In the non-detect section in which hover sensing is performed exclusively, touch sensing may be performed at a low frequency so as to update the touch reference value at appropriate timings to compensate for the fluctuation of the reference value due to an environmental change such as a temperature change.

The memory part 30 may store other data such as constants and/or variables used for the computation of the processor part 20, in addition to the two-dimensional data 31 and the coordinates/threshold/reference value data 32. In the case where the operations of the processor part 20 are implemented by a computer program, a sensor control program may be stored in the memory part 30. The memory part 30 may include a volatile memory such as a DRAM or SRAM, a nonvolatile memory such as a flash memory, and an auxiliary storage device such as a hard disk drive (HDD) or a solid state drive (SDD).

The configuration of FIG. 6 makes it possible to suppress the calculation amount and the power consumption of the touch-sensitive electronic device 1 and to achieve accurate detection of touch and hover.

Figure 7:
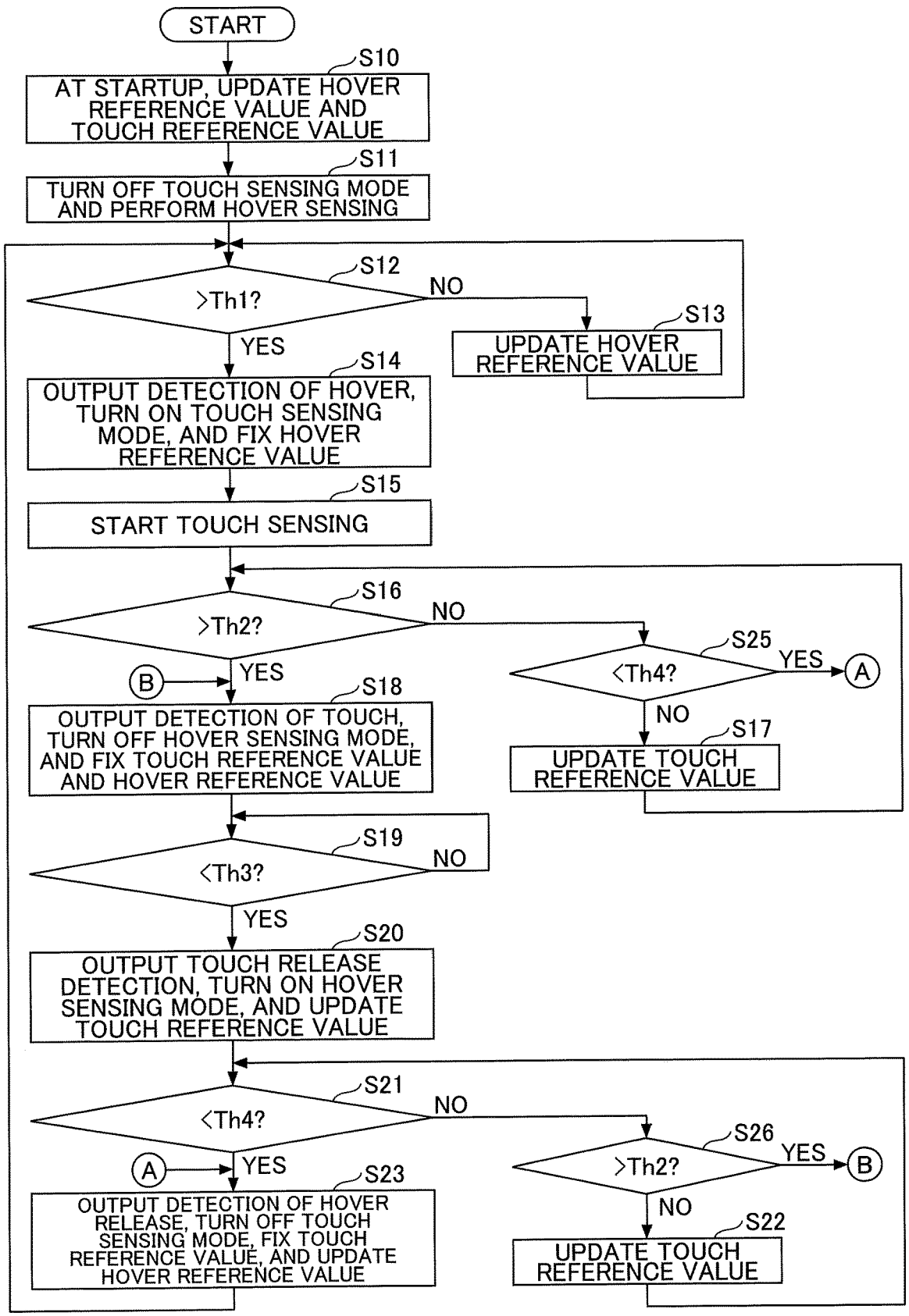
FIG. 7 is a flowchart of a sensor control method according to the embodiment.

FIG. 7 is a flowchart of a sensor control method of the embodiment. This control flow is performed by the processor part 20 of the touch-sensitive electronic device 1, and it is looped because the control flow is performed repeatedly during the operation period of the touch-sensitive electronic device 1. First, when the touch sensor electronic device 1 is boosted or powered on (at startup), the drive and sense cycle of the sensor part 10 is repeated for a predetermined period of time, and the hover reference value and the touch reference value are updated from the last stored values (S10).

When the reference values have been updated to the current values, the touch sensing operation is suspended and hover sensing is performed at a predetermined cycle (S11). Until a hover is detected (in the non-detect section), it is determined whether or not the amount of change in capacitance of each sensor element exceeds the threshold Th1 (S12). If the amount of change in capacitance does not exceed the threshold Th1 (NO in S12), the hover reference value is updated based on the detection result of each sensor element (S13). Then, the process returns to step S12, and S12 and S13 are repeated until the amount of change in capacitance exceeds the threshold Th1.

When the amount of change in capacitance exceeds the threshold Th1 (YES in S12), information indicative of the detection of a hover is output and the touch sensing mode is turned on, while the hover reference value is fixed (S14). Touch sensing operation is started (S15), and it is determined whether or not the amount of change in capacitance at each sensor element exceeds the threshold Th2 (S16). If the amount of change in capacitance does not exceed the threshold value Th2 (NO in S16), then the process proceeds to step S25, and it is determined whether or not the amount of change in capacitance is less than the threshold Th4. If the amount of change in capacitance is equal to or greater than the threshold Th4 (NO in S25), the touch reference value is updated based on the detection result of each sensor element (S17). Then, the process returns to step S16. In this case, a hover sensing section starts, and the loop of S16, S25, and S17 is repeated until the amount of change in capacitance exceeds the threshold Th2.

When the amount of change in capacitance exceeds the threshold Th4 in step S25 (YES in S25), the process jumps to step S23 and a detection of a hover release is output (see the arrow A jumping to S23). This detection result of the hover indicates that the finger has moved away from the operation surface 111 after the hover was detected. In this case, the hover release is output and the non-detect section starts. That is, the touch sensing mode is turned off, and the touch reference value is fixed, while the hover reference value is updated (S23).

When the amount of change in capacitance exceeds the threshold Th2 in step S16 (YES in S16), information indicative of the detection of a touch is output, the hover sensing operation is suspended, and the touch reference value is fixed, like the hover reference value (S18). Then, it is determined whether or not the amount of change in capacitance at each sensor element has become less than the threshold Th3 (S19). The process of S19 is repeated until the amount of change in capacitance becomes less than the threshold value Th3. Once the amount of change in capacitance has become less than the threshold Th3 (YES in S19), information indicative of the detection of a touch release is output, the hover sensing mode is turned on, and updating of the touch reference value is resumed (S20). Then, it is determined whether or not the amount of change in capacitance has become less than the threshold Th4 (S21).

When the amount of change in capacitance is equal to or greater than the threshold Th4 (NO in S21), the process proceeds to step S26 and it is determined whether or not the amount of change in capacitance is greater than the threshold Th2. If the amount of change in capacitance exceeds the threshold Th2 (YES in S26), the process returns to step S18 and the detection of a touch is output (see the arrow B back to S18). This touch detection is the second one detected after the touch release. This means that the finger has come into physical contact with the operation surface 111 again and accordingly, the process after S18 is performed. If the amount of change in capacitance does not exceed Th2 (NO in S26), the touch reference value is updated (S22), and the loop of steps S21, S26, and S22 is repeated until the amount of change has become less than the threshold Th4. When the amount of change in capacitance has become less than the threshold Th4 (YES in S21), then information indicative of the detection of a hover release is output, the touch sensing operation is suspended, and the updating of the hover reference value is resumed (S23). Then, the process returns to S12 to perform hover sensing in the non-detect section.

According to the sensor control method of FIG. 7, as inactivated period is provided for each of the hover sensing and the touch sensing, when either one of the hover sensing and the touch sensing is inactive, the number of sensing actions per unit time of the other mode can be increased. Therefore, detection accuracy is improved. In the section where both the hover sensing and the touch sensing are performed, the sensor part is driven such that the number of detection area for hover sensing is less than the number of detection points for touch sensing. With this scheme, the number of hover sensing cycles is increased and the S/N ratio can be improved.

What is claimed is:

1. A touch-sensitive electronic device comprising:
   a sensor part configured to detect a capacitance that varies according to a touch or a proximity of an operation body on or to an operation surface;
   a memory part that stores a reference value used as a basis of calculation of an amount of change in the capacitance and a threshold value used for detection of the touch or the proximity;
   a processor configured to compare the amount of change in the capacitance calculated based on the reference value with the threshold value and to determine a state of the touch or the proximity with respect to the operation surface; and
   a controller configured to suspend a touch sensing operation in the sensor part during a period when the proximity of the operation body to the operation surface is not detected by the processor, and to suspend a proximity sensing operation in the sensor part during a period when the touch of the operation body on the operation surface is detected by the processor,
   wherein the sensor part has a plurality of detection points, and
   wherein the controller has a first sensing mode for the proximity sensing operation of the sensor part in which the plurality of detection points are grouped into multiple blocks and a change in the capacitance is detected for each block, and a second sensing mode for the touch sensing operation for the sensor part in which the change in the capacitance is detected for each of the detection points.

2. The touch-sensitive electronic device as claimed in claim 1, wherein the controller is configured to activate the first sensing mode and the second sensing mode alternately during a period when the proximity of the operation body with respect to the operation surface is detected by the processor.

3. The touch-sensitive electronic device as claimed in claim 1, wherein the controller is configured to update a first reference value for detection of the proximity during a period when the proximity of the operation body with respect to the operation surface is not detected by the processor, and to stop updating the first reference value when the proximity of the operation body with respect to the operation surface has been detected.

4. The touch-sensitive electronic device as claimed in claim 1, wherein the controller is configured to update a first reference value for detection of the proximity during a period when the proximity of the operation body with respect to the operation surface is not detected by the processor, and to stop updating the first reference value, while updating a second reference value for detection of the touch, when the proximity of the operation body with respect to the operation surface has been detected.

5. The touch-sensitive electronic device as claimed in claim 1, wherein the controller is configured to resume the proximity sensing operation of the sensor part when a touch release from the operation surface has been detected by the processor.

6. The touch-sensitive electronic device as claimed in claim 1, wherein the controller is configured to suspend the touch sensing operation of the sensor part when a proximity release from the operation surface has been detected by the processor.

7. A touch-sensitive electronic device comprising:
   a sensor part configured to detect a capacitance that varies according to a touch or a proximity of an operation body on or to an operation surface;
   a memory part that stores a reference value used as a basis of calculation of an amount of change in the capacitance and a threshold value used for detection of the touch or the proximity;
   a processor configured to compare the amount of change in the capacitance calculated based on the reference value with the threshold value and to determine a state of the touch or the proximity with respect to the operation surface; and
   a controller configured to allow a touch sensing operation and a proximity sensing operation to be performed in the sensor part during a period when the proximity of the operation body to the operation surface is detected by the processor, and to suspend the proximity sensing operation in the sensor part during a period when the touch of the operation body on the operation surface is detected by the processor, wherein the sensor part has a plurality of detection points, and wherein the controller has a first sensing mode for the proximity sensing operation of the sensor part in which the plurality of detection points are grouped into multiple blocks and a change in the capacitance is detected for each block, and a second sensing mode for the touch sensing operation for the sensor part in which the change in the capacitance is detected for each of the detection points.

8. The touch-sensitive electronic device as claimed in claim 7, wherein the controller is configured to activate the first sensing mode and the second sensing mode alternately during a period when the proximity of the operation body with respect to the operation surface is detected by the processor.

9. The touch-sensitive electronic device as claimed in claim 7, wherein the controller is configured to update a first reference value for detection of the proximity during a period when the proximity of the operation body with respect to the operation surface is not detected by the processor, and to stop updating the first reference value when the proximity of the operation body with respect to the operation surface has been detected.

10. The touch-sensitive electronic device as claimed in claim 7, wherein the controller is configured to update a first reference value for detection of the proximity during a period when the proximity of the operation body with respect to the operation surface is not detected by the processor, and to stop updating the first reference value, while updating a second reference value for detection of the touch, when the proximity of the operation body with respect to the operation surface has been detected.

11. The touch-sensitive electronic device as claimed in claim 7, wherein the controller is configured to resume the proximity sensing operation of the sensor part when a touch release from the operation surface has been detected by the processor.

12. The touch-sensitive electronic device as claimed in claim 7, wherein the controller is configured to suspend the touch sensing operation of the sensor part when a proximity release from the operation surface has been detected by the processor.

13. A sensor control method for a touch-sensitive electronic device having an operation surface, comprising:

detecting a capacitance that varies according to a touch or a proximity of an operation body on or to the operation surface;

determining a state of the touch or the proximity with respect to the operation surface by comparing an amount of change with a predetermined threshold value; and suspending a touch sensing operation with respect to the operation surface during a period when the proximity of the operation body to the operation surface is not detected, and suspending a proximity sensing operation with respect to the operation surface during a period when the touch of the operation body on the operation surface is detected, wherein the operation surface has a plurality of detection points, and the sensor control method further comprises operating in a first sensing mode for the proximity sensing operation in which the plurality of detection points are grouped into multiple blocks and a change in the capacitance is detected for each block, and operating in a second sensing mode for the touch sensing operation in which the change in the capacitance is detected for each of the detection points.

* * * * *